G. COOK.
MACHINE FOR COMPRESSING CARRIAGE WHEELS.

No. 39,275. Patented July 21, 1863.

Witnesses

Inventor
George Cook

UNITED STATES PATENT OFFICE.

GEORGE COOK, OF NEW HAVEN, CONNECTICUT.

MACHINE FOR COMPRESSING CARRIAGE-WHEELS.

Specification forming part of Letters Patent No. 39,275, dated July 21, 1863.

*To all whom it may concern:*

Be it known that I, GEORGE COOK, of the city and county of New Haven, and State of Connecticut, have invented a new and useful Machine for Compressing Carriage-Wheels; and I do hereby declare the following to be a full, clear, and exact description of its construction and operation, when taken in connection with the accompanying drawings, making a part of this specification, in which—

Figure 1:
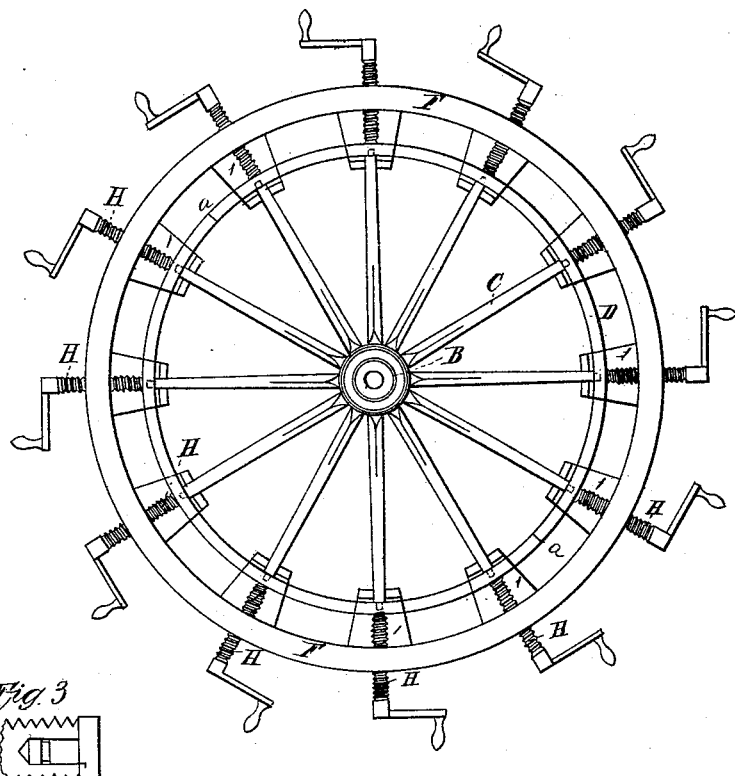
Figure 3:
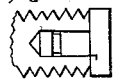
Figure 2:
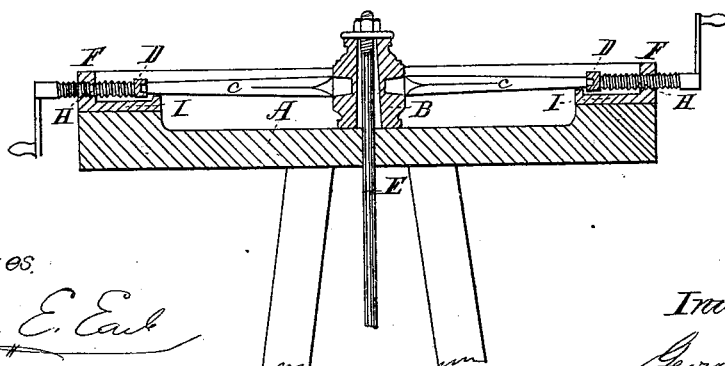

Figure 1 is a plan of my machine, having a wheel placed therein for compression. Fig. 2 is a section of the same. Fig. 3 is a detached view of the inner end of the screws.

Same letters refer to like parts.

In the manufacture of carriage-wheels it is important that all the joints should be solid—that is, that the felly, when fitted, should be firmly compressed into the spokes, and that the joints of the felly should be equally compressed together, in order to stand the wear and tear to which they are constantly exposed. In the ordinary manner of putting together this is very difficult of accomplishment.

The object of my invention is to overcome these difficulties, and by a simple mechanical contrivance accomplish the desired results.

It consists in a ring of metal, whose internal diameter is larger than the wheel to be put together. Through this ring and radial thereto I place as many screws as there are spokes in the wheel within the ring, resting on an ordinary wheel-frame. I place the wheel so that each of the spokes will be in line with one of the screws. When in such position, I turn the screw to press against the periphery of the felly to press the several parts firmly together.

To enable others skilled to make and use my invention, I will proceed to more fully describe its construction and operation.

A is an ordinary wheel-frame; B, the hub of a wheel; C, the spokes; D, the felly. The wheel is fastened to the frame by the bolt E in the ordinary manner.

F is a metallic ring, into which are set the screws H, each screw provided with a crank for convenience of turning. The inner end of each screw is fitted with a swivel (see Fig. 3) to prevent injury to the felly by turning the screw.

I are brackets in which the spokes are placed to insure their proper position.

*a a* are the joints in the felly, supposing the felly to be made in two parts. When thus the wheel is placed in its proper position, I turn the screws down firmly into the felly, fitting each joint of the felly as the compression progresses, and continue so to do until all the parts and joints are firmly and solidly fitted and compressed together.

It may not be necessary to bolt the wheel down on the frame, as shown; but I prefer this manner, as it secures against danger of springing the wheel.

Having thus fully described my invention, what I claim thereon as new and useful, and desire to secure by Letters Patent, is—

The arrangement, described, of the ring F, screws H, and bracket I, when the same are combined in the manner and for the purpose as herein substantially set forth.

GEORGE COOK.

Witnesses:
JOHN E. EARLE,
RUFUS SANFORD.